United States Patent [19]

Glidden

[11] 3,800,096

[45] Mar. 26, 1974

[54] TONE DATA RECEIVER

[75] Inventor: Roger C. Glidden, Wenham, Mass.

[73] Assignee: David H. Scott, Wenham, Mass.

[22] Filed: Sept. 8, 1972

[21] Appl. No.: 287,258

Related U.S. Application Data

[63] Continuation-in-part of Ser. No. 163,246, July 16, 1971, Pat. No. 3,691,593, which is a continuation-in-part of Ser. No. 851,878, Aug. 21, 1969, Pat. No. 3,594,508.

[52] U.S. Cl. .............................. 179/84 VF, 179/5 R

[51] Int. Cl. .......................................... H04m 11/04

[58] Field of Search ..... 179/84 VF, 5 R, 2 A, 2 DP, 179/41 A; 178/66 R

[56] References Cited

UNITED STATES PATENTS

| | | | |
|---|---|---|---|
| 2,847,507 | 8/1958 | Stradley | 179/5 P |
| 3,198,888 | 8/1965 | Lemelson | 179/41 A |
| 3,427,402 | 2/1969 | Stokes | 179/5 P |
| 3,128,349 | 4/1964 | Boesch | 179/84 VF |
| 3,626,098 | 12/1971 | Lee | 179/5 R |
| 3,270,144 | 8/1966 | Vogel | 179/84 VF |
| 3,209,076 | 9/1965 | Vogel | 179/84 VF |
| 3,200,205 | 8/1965 | Herter | 179/84 VF |

*Primary Examiner*—William C. Cooper
*Assistant Examiner*—David L. Stewart
*Attorney, Agent, or Firm*—Clarence A. O'Brien; Harvey B. Jacobson

[57] ABSTRACT

A coded message receiver powered solely by energy withdrawn from telephone lines to which it is connected, monitors the lines and responds to a plurality of different signals of predetermined frequencies transmitted after the receiver station is dialed. Coded signal pulses transmitted at certain of said frequencies are registered by visual and audible indicators and recorded on tape only when transmitted simultaneously with a guard tone signal at another frequency. A terminate switch is actuated to disable the signal responsive monitors and signal registers as well as to transmit a return signal to the telephone lines.

7 Claims, 5 Drawing Figures

TONE DATA RECEIVER

The present invention relates to the automatic transmission of data through commercial telephone communication lines and more particularly relates to the equipment at a data receiving station forming part of a system disclosed in my prior copending application Ser. No. 163,246, filed July 16, 1971, now U.S. Pat. No. 3,691,593, issued Sept. 19, 1972, with respect to which the present application is a continuation-in-part. Said prior copending application is in turn a continuation-in-part of application Ser. No. 851,878, filed Aug. 21, 1969, now U.S. Pat. No. 3,594,508, issued July 20, 1971.

In my prior copending application aforementioned, a system is disclosed in which various conditions are monitored by sensors at a plurality of remotely spaced reporting stations from which coded data is transmitted by conventional telephone lines to a central data receiving station. At each reporting station, the data receiving station is automatically dialed and coded information transmitted in an automatically programmed manner. Operation of the transmitting equipment is such as to ensure message or transmission security by cooperation with equipment at the receiving station from which programming of the reporting station is controlled to some extent.

It is therefore an important object of the present invention to provide a data receiving unit at the central data receiving station of the aforementioned system which will not only cooperate with the transmitting equipment in controlling its programming but will also register the information received in an efficient and convenient manner and also be operated by a minimal amount energy withdrawn solely from the telephone lines to ensure functional reliability without interference with normal telephone operation.

In accordance with the present invention, a data receiving station when dialed from a remote reporting station, will continuously monitor the signals transmitted through the telephone lines to its message terminals in order to sense and respond to a seize or guard tone signal of a particular frequency. Detection of this seize tone signal by only one tuned circuit continuously loading the lines places into operation one or more code tone responsive devices one of which is activated by a corresponding code tone frequency for feeding coded message signals such as station identification, location or event, to a plurality of signal registers that are also rendered operative in response to detection of the seize tone signal aforementioned. Signal voltages as well as operating voltages are supplied to the various aforementioned components of the receiver through a power converter to which the message terminals of the telephone lines are connected. The registers include visual and audible indicators as well as a tape recorder. Each message cycle may be repeated upon manual reset of the visual indicator as a result of transmitter recycling at the reporting station. By means of a return signal generated at the receiving station, recycling of the transmitter at the reporting station may be stopped upon actuation of a terminate switch. The terminate switch simultaneously disables the signal monitoring components and registers. A ring relay circuit may be provided between the message terminals and the power converter in order to meet telephone utility requirements.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
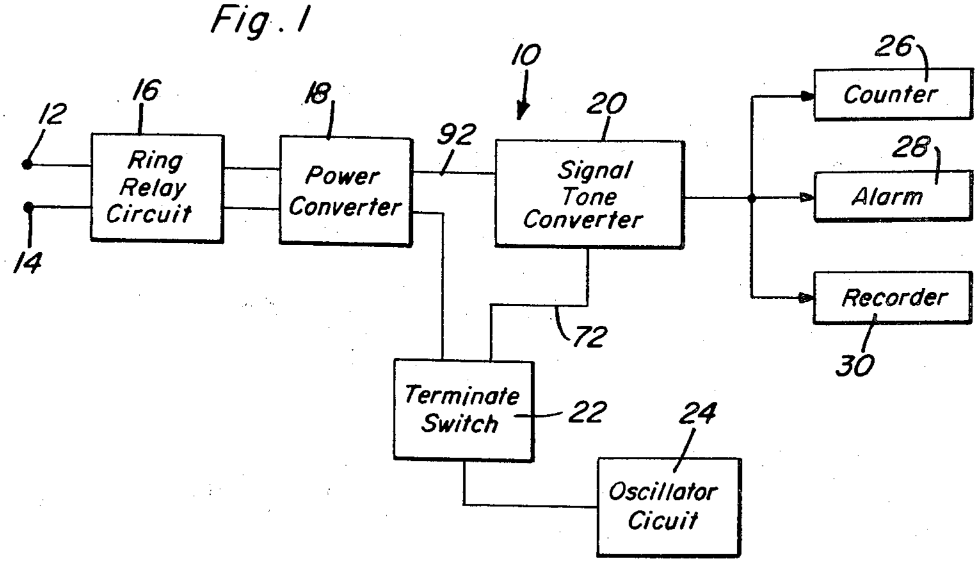
FIG. 1 is a schematic block diagram illustrating the arrangement of components at the data receiving station.

Referring now to the drawings in detail, FIG. 1 diagrammatically illustrates the receiver unit at a data receiving station generally denoted by reference numeral 10. The receiving unit is coupled to the telephone lines of a conventional telephone communication system through message terminals 12 and 14 across which a voltage is normally maintained of 48 VDC, for example. When the receiving station is dialed, the voltage across the terminals drops to a lower value and signal frequency tones are superimposed, originating from a data reporting station as indicated in my prior copending applications aforementioned.

In the illustrated embodiment of the invention, the message terminals are coupled to a ring relay circuit 16 in order to establish a normal telephone hook-up in accordance with telephone utility requirements with the receiving station is dialed. The ringing voltage accordingly establishes a connection between the message terminals and the power converter 18 by means of which signals are transmitted to the signal tone converter 20 and operating voltage derived from the energy available at the message terminals is supplied to the signal tone converter through a terminate switch assembly 22 and to an oscillator circuit 24 from which a return signal is generated. The signal tone converter 20 thus senses the tone signals transmitted to the message terminals from the reporting station in order to register coded signals by means of a visual counter 26, an audible indicator or alarm 28 and on a record medium by means of a recorder 30. The format of the incoming signal data is a series of short tone bursts representing a train of pulses as commonly used for telephone code signalling purposes. The audible indicator or alarm 28 will notify personnel at the receiving station that a message is being received, while the visual indicator or counter 26 will inform personnel as to completion of a message cycle. The message cycle may be either repeated upon reset of the counter or terminated by actuation of the terminate switch assembly 22. The terminate switch is operative to disable the signal tone converter 20 by disconnecting operating voltage therefrom and at the same time render the oscillator circuit 24 operative and transmit the return tone signal generated thereby to the telephone message terminals through the power converter 18.

Figure 2:
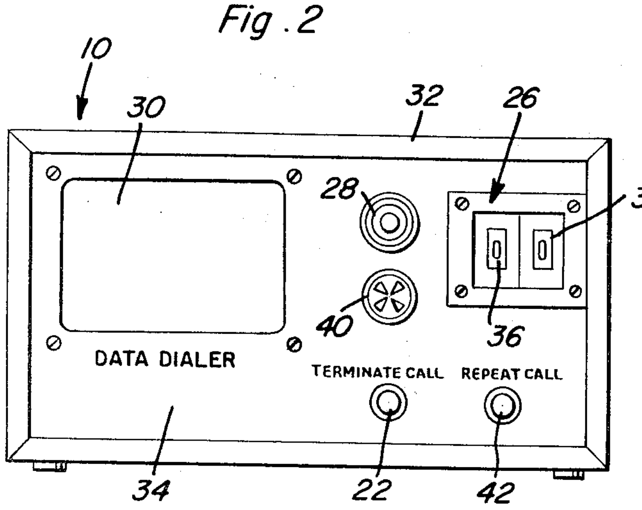
FIG. 2 is a front elevational view of a receiving unit incorporating the components diagrammed in FIG. 1.
Figure 5:
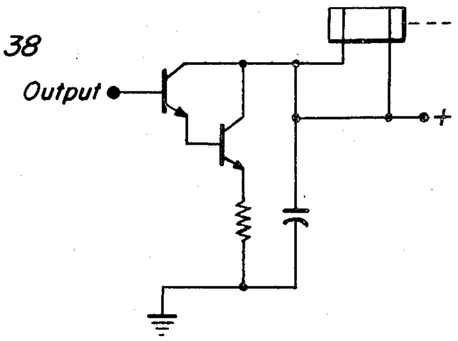
FIG. 5 is a circuit diagram of the relay circuits shown in FIG. 3.
Figure 4:
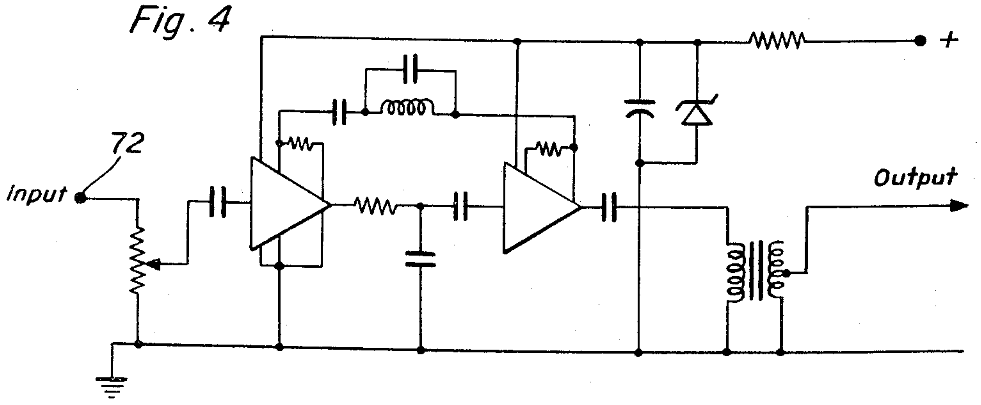
FIG. 4 is a circuit diagram of the tone receiver circuits shown in FIG. 3.

FIG. 2 illustrates a typical physical embodiment of the receiving equipment at the receiving station which includes a housing 32 within which the various components are enclosed. A front panel 34 of the housing exposes a receptacle for a commercially available cassette type tape recorder 30. A decade type of counter 26 is also mounted on the panel and includes a unit display section 36 and a tens display section 38. Also positioned on the panel, is the output transducer of the audible alarm indicator 28 and a flag-type indicator 40 to signify whether or not power is available at the message terminals of the telephone lines. The front panel 34 also labels the terminate switch 22 and a repeat call switch 42. The counter 26 and ring relay circuit 16 are simultaneously reset by actuation of the switch 42 in order to render the receiver unit operative for receiving another message cycle.

Figure 3:
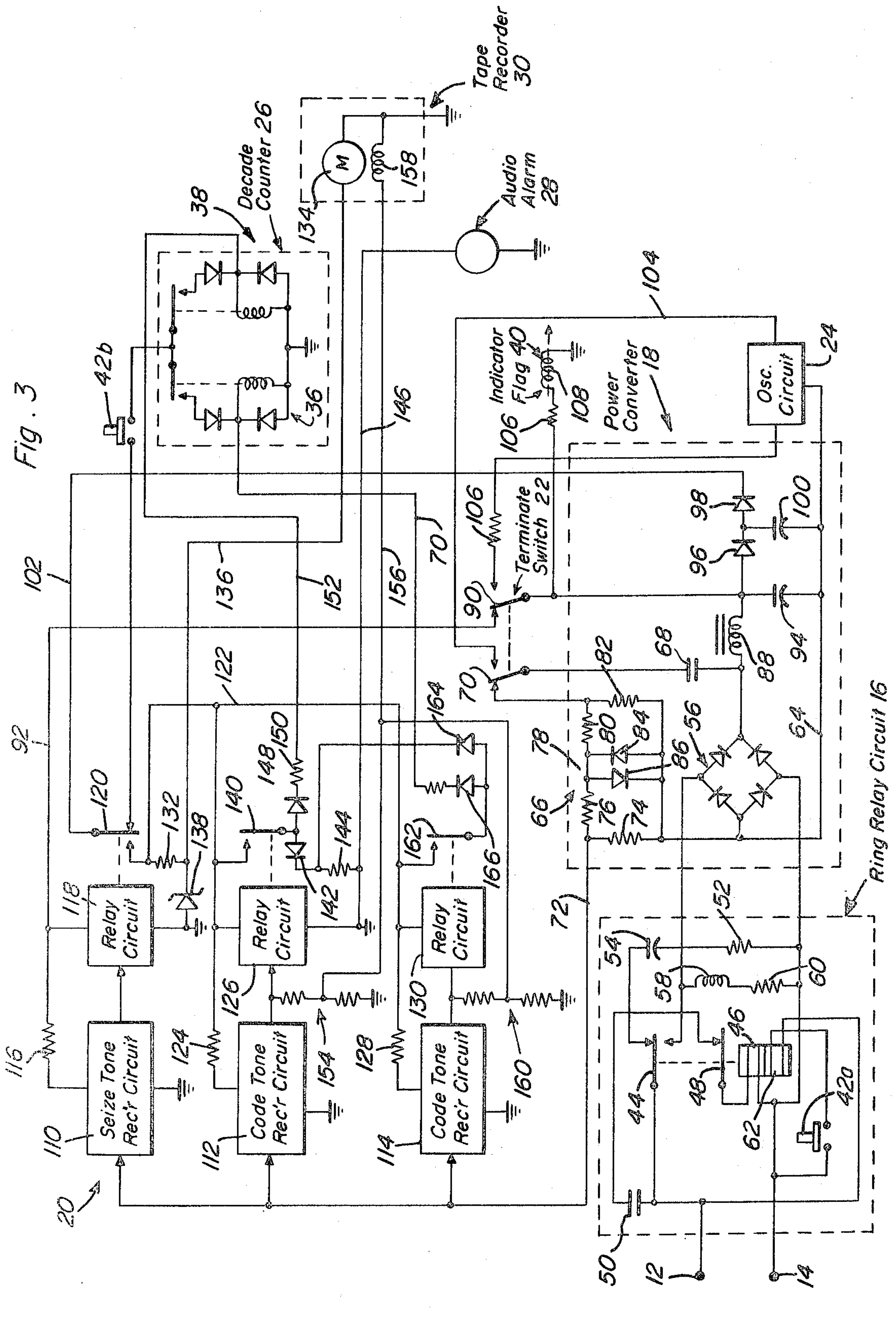
FIG. 3 is an electrical circuit diagram corresponding to the receiving unit.

Referring now to FIG. 3, the message terminals 12 and 14 are respectively connected to a relay switch 44 and one terminal of a DC latching relay coil 46 in the ring relay circuit 16. The other terminal of the DC latching relay coil 46 is connected to a normally closed relay switch 48. The normally engaged contact of the relay switch 48 is connected through a signal coupling capacitor 50 to the message terminal 12. Accordingly, when a ring voltage is established across the message terminals in response to dialing of the receiving station, the DC latching coil 46 is energized to actuate its relay switches 44 and 48 and hold them in the actuated position. In the unlatched positions of the relay switches 44 and 48 as shown in FIG. 3, an RC load consisting of resistor 52 and capacitor 54 are connected across the message terminals in order to simulate the usual load associated with the ring circuit. Actuation of the relay switches to the latched position disconnects this load from the message terminals and transfers the message terminals to the input terminals of a full wave rectifier bridge circuit 56 connected in parallel with the series connected inductance 58 and resistor 60 for proper loading of the message lines during a message cycle. The message cycle is repeated or the receiving unit prepared for another call by unlatching of the relay coil 46 through the reset coil section 62 connected in series with a reset switch section 42*a* across the message terminals. The reset switch section 42*a* is normally opened and actuated to a closed position simultaneously with a ganged switch section 42b, the function of which is to be described hereinafter.

The rectifier bridge circuit 56 forms part of the power converter component 18 and is operative to avoid any voltage polarity problems. One output terminal of the bridge circuit is connected by conductor 64 to a signal attenuator network 66 and to the oscillator circuit 24. The other output terminal of the bridge circuit is connected through signal coupling capacitor 68 and one of the switches 70 in the terminate switch assembly 22 to the other input terminal of the signal attenuator network 66 from which an output line 72 extends to the signal tone converter generally referred to by reference numeral 20. The signal attenuator network 66 includes resistive arms 74 and 76 having a juncture connected to the output line 72 and end terminals connected to one of the output terminals of the bridge circuit 76 and to a common terminal 78 to which another resistive arm 80 is connected. A fourth resistive arm 82 forms a juncture with resistive arm 80 at the other input terminal and is connected to the output terminal of the bridge circuit. A pair of reverse biased diodes 84 and 86 are interconnected in parallel between the output terminal of the bridge 56 and the common terminal 78 between resistive arms 76 and 80.

It will be apparent therefore, that signal voltage will be transmitted through coupling capacitor 68 and the switch section 70 in its normal position to the signal tone converter through the signal attenuator 66 at the proper level for signal frequency detection.

The output terminal of the bridge circuit 56 is also connected through the inductance 88 and the other switch section 90 of the terminate switch assembly 22 to the signal converter component 20 by means of conductor 92 in order to furnish operating voltage. The voltage is filtered by the filter capacitor 94. Operating voltage is also supplied through diodes 96 and 98 connected in series to each other and filtered by capacitor 100 in order to feed regulated voltage through line 102 to the signal tone converter and the registers including the decade counter 26, tape recorder 30 and audio alarm 28. When the terminate switch 22 is actuated, the signal attenuator 66 is disconnected through switch section 7 from the power converter while the operating voltage from the power converter is transferred by switch section 70 to the oscillator circuit through line 14. The return tone signal then generated by the oscillator circuit is transmitted by resistor 106 and the actuated switch section 90 to the power converter from which the return signal is fed to the message terminals.

In order to monitor any power failure at the telephone message terminals, the power converter is connected by resistor 106 to an indicator coil 108 associated with the flag indicator 40. Accordingly, when power is available at the message terminals, the indicator coil 108 will be energized in order to display a white flag on the flag indicator 40 as depicted for example in FIG. 2. When the indicator coil 108 is de-energized as a result of power failure, the flag indicator 40 will show a red color.

As hereinbefore indicated, audio tone signals are fed through line 72 to the signal tone converter which in the illustrated embodiment includes three tone responsive receiver circuits 110, 112 and 114 having inputs connected in parallel to the signal line 72. The seize tone receiver circuit 110 is continuously operative to monitor the existence of a guard or seize tone signal of 680 Hz and toward this end, operating voltage is continuously supplied to the seize tone receiver circuit from the power converter through the switch section 90, conductor 92 and resistor 116. Operating voltage is also supplied to a relay circuit 118 associated with the seize tone receiver circuit. Thus, in response to detection of the seize tone signal, an output is produced by the receiver circuit 110 to energize the relay circuit 118 and thereby actuate its associated relay switch 120. When actuated, the relay switch 120 transfers operating voltage in line 102 from its normally engaged contact connected to the reset switch section 42*b*, to the other switch contact thereby supplying operating voltage through conductor 122. The voltage supply conductor 122 is connected by resistor 124 to the code tone receiver circuit 112 and the associated relay circuit 126. Operating voltage is also supplied through resistor 128 to the code tone receiver circuit 114 and directly from the voltage supply conductor 122 to its associated relay circuit 130. Operating voltage is at the same time supplied through the actuated relay switch 120, resistor 132 and conductor 136 to the tape transport motor 134 associated with the recorder 30. The voltage supplied to the motor is regulated by means of the zener diode 138 connected between ground and the line 136. Thus, detection of the seize tone signal by the receiver circuit 110 renders the other code tone receiver circuits operative as well as to place the recorder into operation.

After approximately ten seconds of seize tone signal reception, an 1,190 Hz code tone signal is detected by the code tone receiver circuit 112 during a message cycle in accordance with the system of the present invention. The output of the receiver circuit 112 is then operative to energize its associated relay circuit 126 thereby closing its normally open relay switch 140. Operating voltage is thereby supplied from line 122, diode 142 and resistor 144 to the audio alarm 28 through conductor 146. Personnel at the receiving station is thereby alerted to the reception of coded information. Operating voltage is at the same time supplied from the actuated relay switch 140, diode 148 and resistor 150 to the operating coil associated with the unit 38 of the decade counter by means of conductor 152. Each code tone pulse is accordingly operative to step the units display by one digit. At the same time, the output of the code tone receiver circuit 112 is fed at a proper level through the voltage divider network 154 and conductor 156 to the recording head 158 of the tape recorder 30 in order to record the code tone pulses. Code tone pulses transmitted by the code tone receiver circuit 112 is designed to occur within a time period of less than five seconds.

A second sequence of coded tone pulses is then adapted to be detected by the code tone receiver circuit 114 responsive to a signal frequency of 1605 Hz. The output of the receiver circuit 114 is transmitted at the proper level through its voltage divider 160 to the signal line 156 connected to the recording head 158 of the recorder. The relay circuit 130 associated with the receiver circuit 114 on the other hand is operative to close its normally open relay switch 162 thereby supplying operative voltage from line 122 to the audio alarm 28 in series with the diode 164 and the resistor 144. Operating voltage is at the same time supplied through diode 166 and resistor 168 to the operating coil of the tens section 36 of the decade counter by means of conductor 170. Thus, the audio alarm 28 continues to operate in order to alert personnel while the decade counter visually signifies reception of the second coded train of pulses which are also recorded by the tape recorder.

When coded pulses are no longer being received as reflected by the visual and audio indicators 26 and 28, personnel may actuate the ganged switch sections **42*a* and 42*b* of the repeat coil switch 42 in order to effect recycling of the data transmitter at the reporting station which will then re-dial the receiving station to begin another message cycle. When reception of the message has been verified, personnel may actuate the terminate switch assembly 22 in order to stop recycling of the transmitter as aforementioned, by disconnecting the power converter from the signal supply line 72 and the voltage supply line 92. At the same time, operating voltage will be supplied through switch section 70 and line 104 to the oscillator circuit while the return signal output thereof at 950 Hz is fed through resistor 16 and switch section 90 to the power converter. This return signal is then transmitted to the message terminals and the reporting station in order to control programming by stopping recycling. The reset switch assembly 42 should then be depressed in order to return the counter to zero settings by supply of operating voltage through line 102 and relay switch 120 and switch section 42*b* to the operating coils of the counter. The other switch section 42*a*, will unlatch the DC latching relay 46** of the ring relay circuit as aforementioned in preparation for reception of another call.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a communication system having a signal transmission line to which a potential is applied, a signal receiving unit connected to said transmission line comprising a plurality of frequency responsive devices respectively tuned to different signal frequencies of coded signals transmitted by said transmission line, power converter means connecting said transmission line to one of the frequency responsive devices for continuously rendering the same operative, relay means responsive to detection of one of said signal frequencies by said one of the frequency responsive devices for rendering another of the frequency devices operative simultaneously with said one of the frequency responsive devices, means for registering coded signals detected by said other of the frequency responsive devices at a second of the signal frequencies, and means for transmitting the coded signals from each of the frequency responsive devices, except said one of the frequency responsive devices, to the registering means only while said one of the signal frequencies is being simultaneously detected, a third of the frequency responsive devices being rendered operative simultaneously with said second of the frequency responsive devices to detect coded signals at a third of said signal frequencies, and relay means connected to each of said second and third of the frequency responsive devices for alternatively operating the register means.

2. The combination of claim 1 including signal generating means energized by said power converter means for producing a return signal, and selectively actuated switch means for simultaneously disabling the frequency responsive devices and transmitting said return signal to the transmission line.

3. The combination of claim 2 wherein said registering means includes visual and audible indicator means and a signal recorder.

4. The combination of claim 3 wherein said power converter means includes a signal attenuator transmitting the coded signals from the transmission line to the frequency responsive devices in parallel and filter means connecting the transmission line to the frequency responsive devices, the registering means and the signal generating means for supply of operating voltage only during signal transmission.

5. The combination of claim 1 wherein said register means includes visual and audible indicator means and a signal recorder.

6. In combination with a telephone system having a pair of message terminals at a dialed station across which a voltage is maintained, continuous monitoring means connected to said terminals for detection of a seize tone signal, at least one signal responsive device connected to the terminals for detection of code tone signals, means connected to the continuous monitoring means for rendering the signal responsive device operative only during detection of said seize tone signal, signal indicator means connected to the signal responsive device for registering detection of said code tone signals, signal generating means for producing a return signal, and selectively operated switch means for simultaneously disabling the continuous monitoring means and transmitting said return signal to the message terminals, said indicator means including a counter, and means rendered operative upon cessation of the seize tone signal for resetting the counter.

7. The combination of claim 6 including a signal recording means rendered operative by the continuous monitoring means during detection of the seize tone signal to record the code tone signals detected by the receiver device.

* * * * *